(12) United States Patent
Berman

(10) Patent No.: US 7,042,610 B1
(45) Date of Patent: May 9, 2006

(54) METHOD AND APPARATUS FOR IMPROVED WAVEPLATES AND SUPPRESSION OF STRAY LIGHT IN LCOS KERNEL APPLICATIONS

(75) Inventor: Arthur Berman, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 0 days.

(21) Appl. No.: 10/845,440

(22) Filed: May 12, 2004

Related U.S. Application Data

(63) Continuation-in-part of application No. 10/371,835, filed on Feb. 20, 2003, now Pat. No. 6,934,066.

(60) Provisional application No. 60/470,115, filed on May 13, 2003.

(51) Int. Cl.
*G02B 26/08* (2006.01)

(52) U.S. Cl. .................. 359/226; 359/237; 359/251

(58) Field of Classification Search .............. 359/256, 359/237, 238, 251, 250, 249, 246
See application file for complete search history.

(56) References Cited

U.S. PATENT DOCUMENTS

| 3,527,522 A * | 9/1970 | Baumgartner ............... 359/292 |
| 5,504,629 A * | 4/1996 | Lim .......................... 359/850 |
| 2004/0165247 A1* | 8/2004 | Berman et al. ............. 359/256 |
| 2004/0169826 A1* | 9/2004 | Segler et al. ................ 353/69 |

\* cited by examiner

*Primary Examiner*—Timothy Thompson
(74) *Attorney, Agent, or Firm*—John Carpenter; Reed Smith, LLP

(57) ABSTRACT

Optical components are louvered with a light absorptive material that absorbs stray light rays. The louvers are constructed, for example, using a "black" thin film coating between sheets of glass. The louvered components are placed in an optical path at one or more orientations. In one embodiment, a vertically oriented louvered component and a horizontally oriented louvered component are individually located in a light path to reduce and/or eliminate stray light having either horizontal and/or vertical vector components. Compensated higher order waveplates are constructed from birefringent material by placing two higher order waveplates (a $n\lambda$ waveplate and a $(n+\Delta)\lambda$ waveplate.) in proximity to each other such that their principle retardation axes are perpendicular. In one embodiment, the higher order waveplates include louvers for stray light suppression.

43 Claims, 10 Drawing Sheets

FIG. 4
Starting material
Plates of glass
Step 1
One side of the glass sheet is coated with a light absorbing thin film
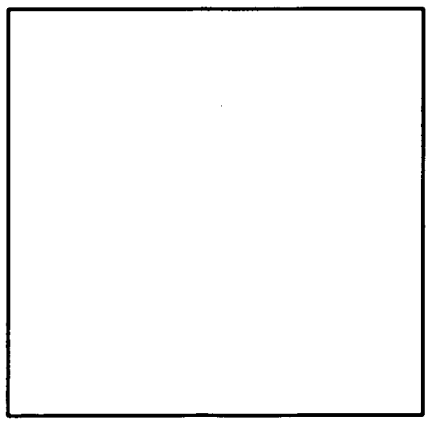
Step 2
The coated sheets are stacked and bonded together
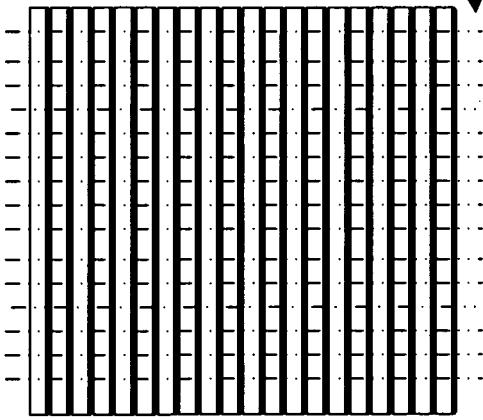
Step 3
The stacked sheets are cut along the indicated lines
Cut lines
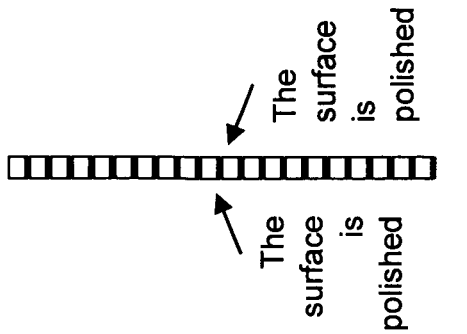
Step 4
Edge view of a single component after cutting
The surface is polished
The surface is polished

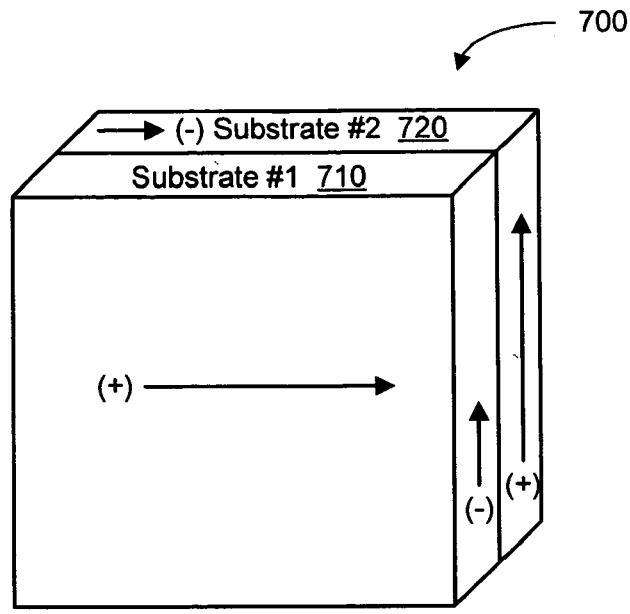
Substrates are made of quartz
Arrows mark the fast or slow optical axis
Thickness of substrate #1 is 40 lambda
Thickness of substrate #2 is 40 ¼ lambda
FIG. 7
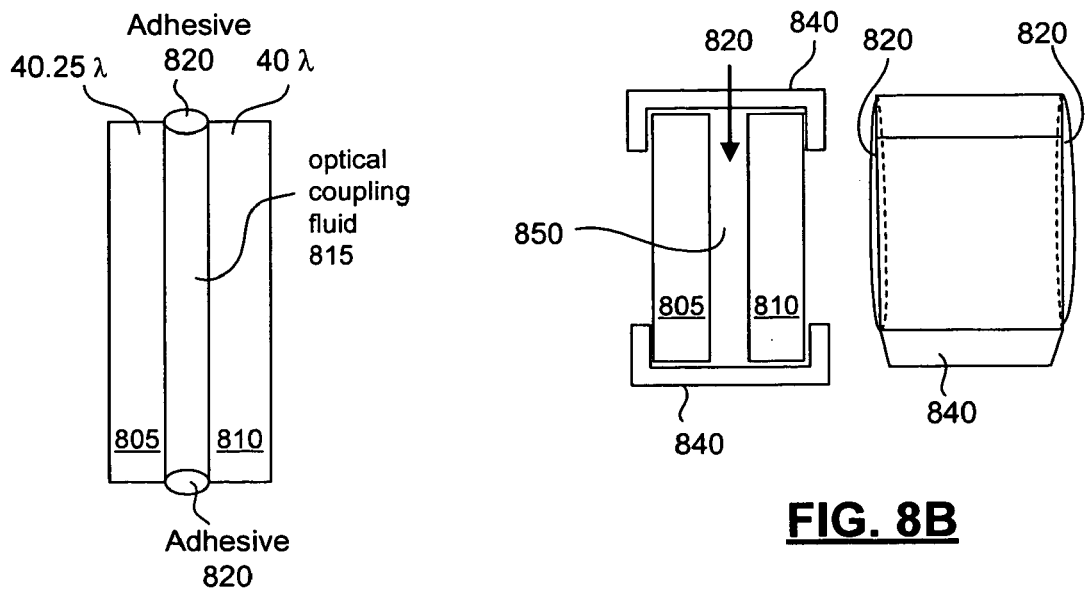
FIG. 8A
FIG. 8B

US 7,042,610 B1

METHOD AND APPARATUS FOR IMPROVED WAVEPLATES AND SUPPRESSION OF STRAY LIGHT IN LCOS KERNEL APPLICATIONS

CROSS REFERENCE TO RELATED APPLICATIONS AND CLAIM OF PRIORITY

This invention claims priority to the following now abandoned U.S. provisional patent application, which is incorporated herein by reference, in its entirety:

Berman, Provisional Application Ser. No. 60/470,115, entitled "Method and Apparatus to Suppress Stray Light in LCoS Kernel Applications,", filed, May 13, 2003.

This application is also a continuation-in-part to Berman et al, application Ser. No. 10/371,835, entitles "METHOD AND APPARATUS FOR USE AND CONSTRUCTION OF COMPENSATED HIGHER ORDER WAVEPLATES,", filed now U.S. Pat. No. 6,934,066 Feb. 20, 2003, the contents of which are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The inventions disclosed in this document are devices, techniques, and methods to suppress stray light in an optical system. More specifically, the invention suppresses stray light in a LCoS based prism assembly/kernel and, by doing so, improves the contrast ratio of the projected video image.

2. Discussion of Background

FIG. 1 is a drawing of an LCoS based video projection system. Stray light is one factor that limits the contrast ratio produced by a LCoS based video projection system. Stray light can be generated within the prism assembly/kernel in several ways including:

Diffraction from the microdisplay.
Non-specular reflection from the surface of the microdisplay.
Reflections from interfaces between the components in the optical path.
Scattering from imperfections on the optical surfaces, in the thin film coatings or within the bulk materials.

Some of the stray light inevitably exits the kernel to be included in the projected image. The stray light adds light intensity but not content to the video image. In current light engine designs and applications, this can be a significant contrast ratio-limiting factor. Techniques used to suppress stray light include:

The use of picture frame baffles.
Removing light rays that impact and scatter/reflect from the walls of the prism assembly. The removal is accomplished by either absorbing or transmitting the stray light rays.

However, the present inventors have determined that, in actual light engine applications, these techniques are insufficient. And, the present inventors have realized the need for further and better suppression of stray light.

The LCoS based video projection system also utilizes a number of optical components, such as beam splitting elements, waveplates, dichroics, etc.

SUMMARY OF THE INVENTION

The present inventors have realized the need for improvements in stray light suppression, and the need for varying configurations of optical elements, such as waveplates, within optical systems. Most notably, and although applicable to other optical systems, the techniques and improvements discussed herein are particularly applicable to Liquid Crystal on Silicon (LCoS) based Light Management Systems (LMSs), and LMSs used in projection systems such as LCoS based projection televisions.

In one embodiment, the present invention provides a stray light suppressing optical element comprising a first set of parallel louvers. The louvers are, for example sandwiched between layers of transparent materials. The louvers are oriented with respect to another similarly constructed stray light suppressing optical element for greater effectiveness. The orientation is, for example, 90 degrees.

The present invention includes a method, comprising the steps of, coating a surface of a set of transparent materials with a light absorptive thin film layer, bonding the set of coated transparent materials to create a multi-layer sandwich having layers in an order comprising light absorptive thin film, transparent material, light absorptive thin film, transparent material, and so forth, cutting the bonded materials into thin sheets, each sheet comprising a strip of transparent material, thin film layer, a strip of transparent material, a thin film layer, and so forth, and polishing the cut surfaces of the thin sheets. In one embodiment, the transparent material is bi-refringent and has a principle axis of retardation that is set to be either perpendicular or parallel to the thin film coating.

In yet another embodiment, the present invention comprises a stray light suppressing compensated higher order waveplate, comprising, a first substrate having a first axis of retardation, a first series of louvers disposed in the first substrate, and a second substrate having a second axis of retardation, wherein the first substrate and the second substrate are positioned such that the first axis of retardation is set at an angle to the second axis of retardation.

In still yet another embodiment, the present invention is A wavelength band specific retarder, comprising, a set of compensated higher order waveplates each having a principle axis of retardation and a predetermined target wavelength, wherein, the set of higher order waveplates are arranged in series, and the waveplate main axes are oriented at individual angles of orientation to a reference line such that the specific wavelength band is retarded when passing through the wavelength band specific retarder.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is an illustration of a fabrication technique of a stray light suppressing component according to an embodiment of the present invention;

FIG. 7 is a drawing of a compensated higher order waveplate 700 constructed according to an embodiment of the present invention;

FIG. 8A is a drawing of liquid coupled optical elements (e.g., waveplates) according to various embodiments of the present invention;

FIG. 8B is a drawing of a frame according to embodiments of the present invention;

DESCRIPTION OF THE PREFERRED EMBODIMENTS

Figure 1:
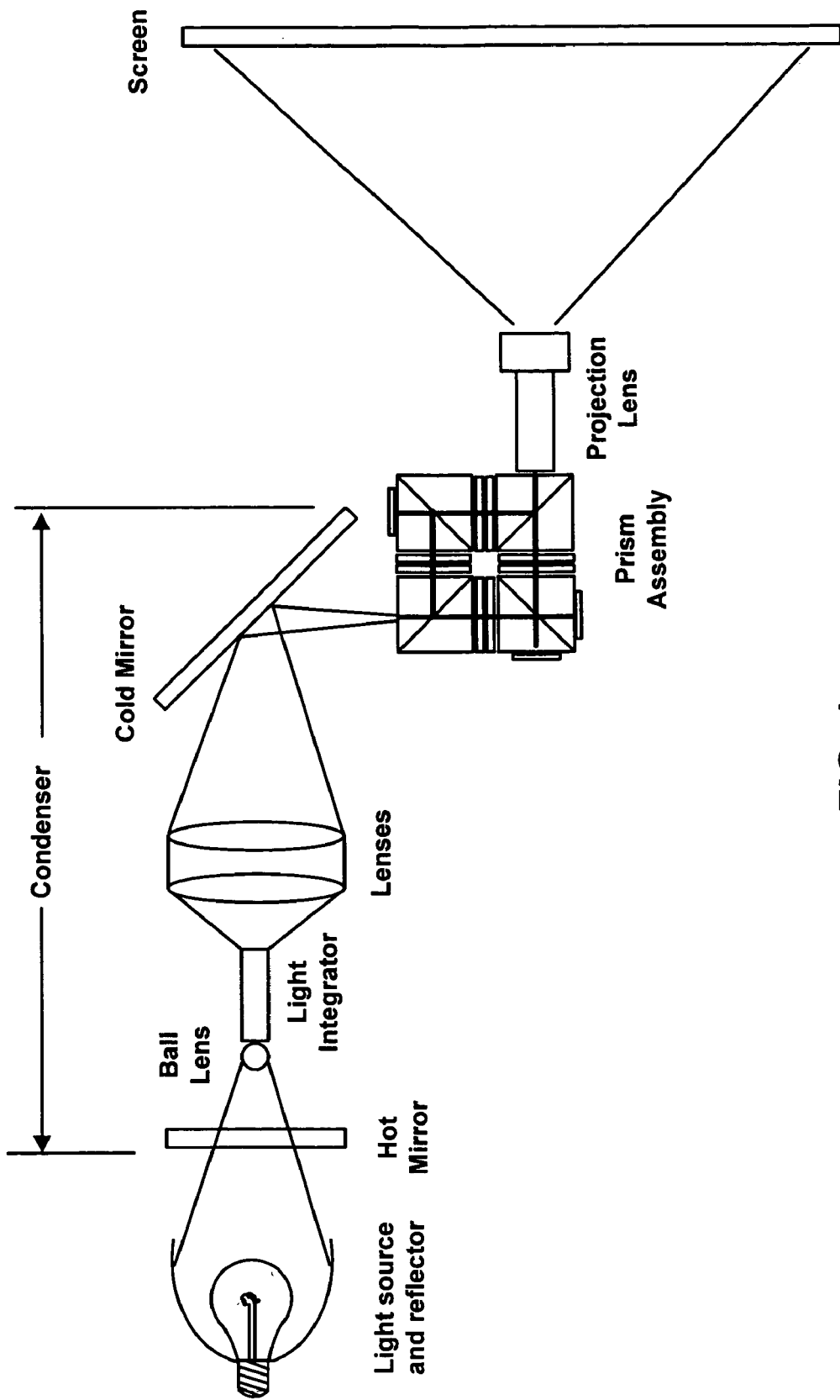
FIG. 1 is a drawing of a conventional LCoS based video projection system.
Figure 2:
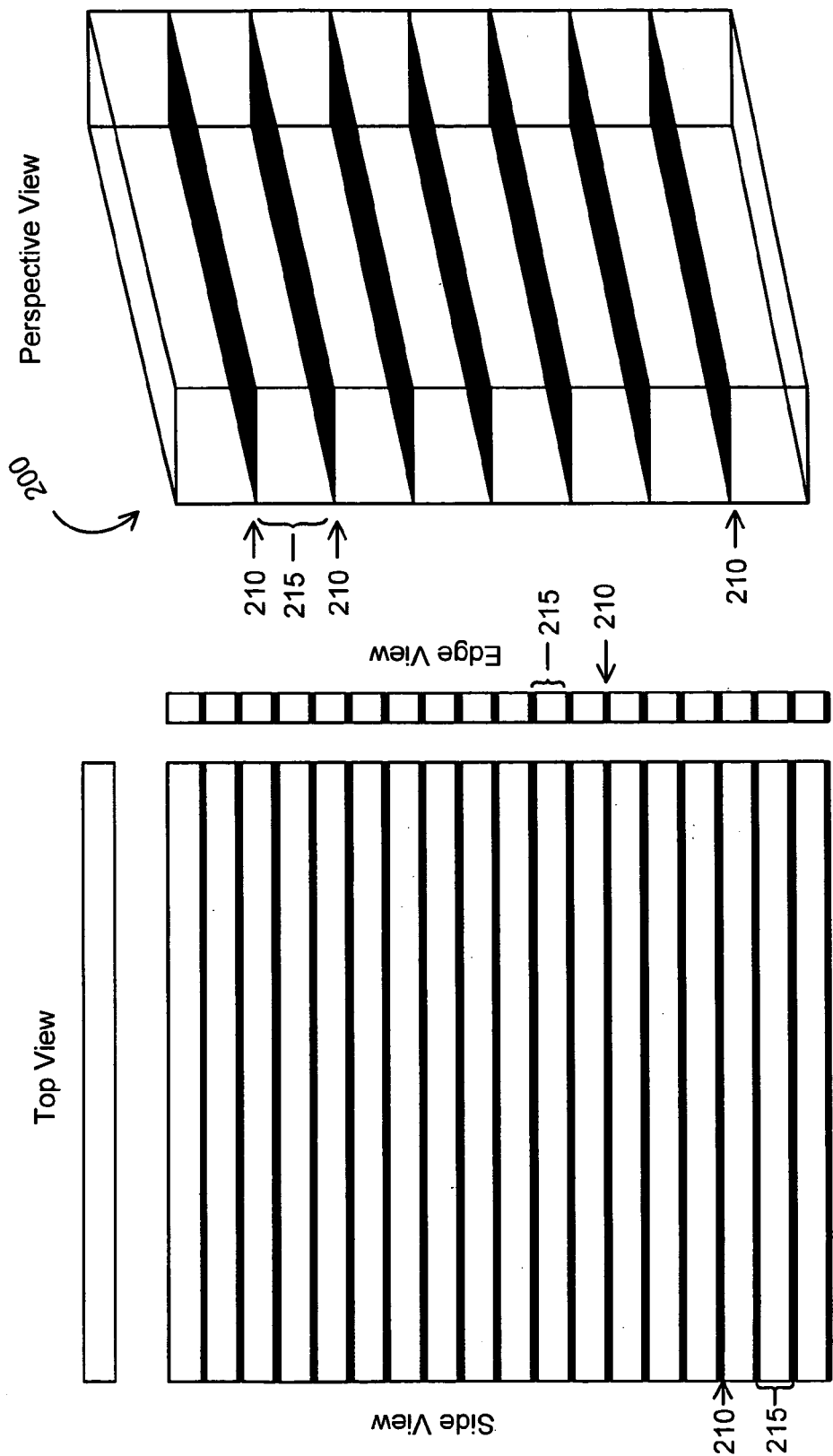
FIG. 2 is an illustration of a stray light suppressing component according to an embodiment of the present invention.

A configuration of a stray light-suppressing component 200 is illustrated in FIG. 2 using perspective, top, side, and edge views. The stray light-suppressing component 200 is composed of a series of parallel, absorptive louvers 210. Spaces, or layers, between the louvers 210 are transparent.

Figure 3:
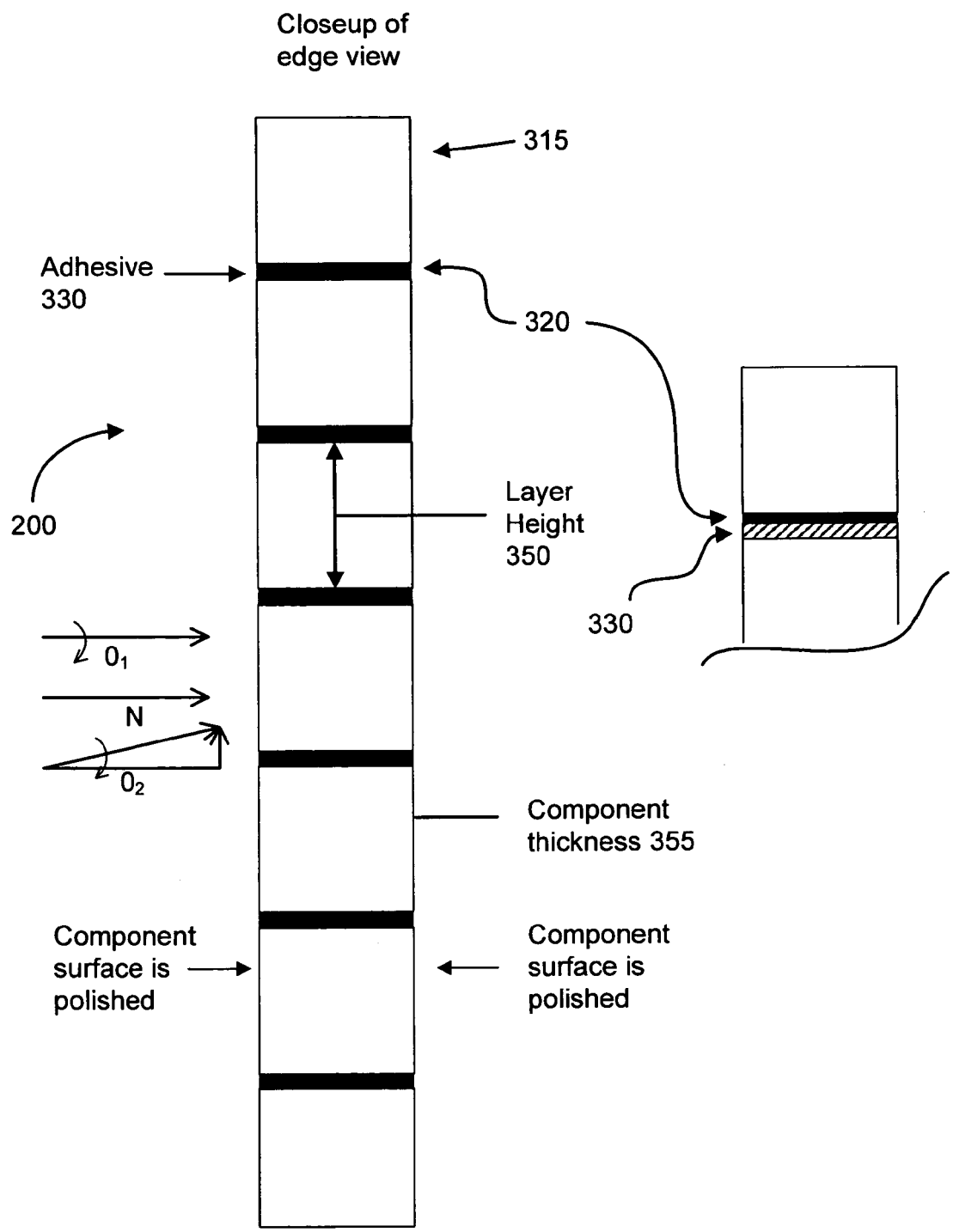
FIG. 3 is an illustration of a close up of an edge view of the stray light suppressing component according to an embodiment of the present invention.

FIG. 3 is an illustration of a close up of an edge view of the stray light suppressing component according to an embodiment of the present invention. As shown in FIG. 3, the stray light-suppressing component 200 is composed of a stack of transparent layers 315. The transparent layers 315 are, for example, constructed of glass or another suitable transparent material (e.g., plastics, clear crystal, etc.). One long surface of each strip is coated with a visible light absorbing (black) thin film 320. The strips are bonded together with an adhesive 330 such that the louvers are parallel to each other and perpendicular or parallel to the other surfaces of the component.

The construction of the component is such that:

Light rays impacting at a right angle (normal N) to the component are transmitted at substantially 100%.

Light rays impacting at an off axis angle (e.g., $O_1$) are transmitted at substantially 100% if the projection of the impact vector is parallel to the louvers.

Light rays impacting at an off axis angle (e.g., $O_2$) will undergo attenuation if the projection of the impact vector has a component that is perpendicular to the louvers. The extent of the attenuation increases with the size of the perpendicular component.

FIG. 4 illustrates one technique by which the stray light-suppressing component can be fabricated. The starting materials are, for example, sheets of glass. The layer height is determined by the thickness of the glass sheets.

Step 1: One side of each sheet is coated with a "black" thin film coating. One such coating is the black chrome thin film "mask" material offered by Thin Film Devices Corp. located in Anaheim, Calif. Other thin films having absorption may also be utilized.

Step 2: A stack of sheets is the bonded together using an adhesive.

Step 3: The stack is cut into thin strips.

Step 4: The cut surfaces are polished.

Note that the light-blocking layer is so thin that little light loss is associated with the fill factor. In addition, the component will be installed within a prism assembly/kernel in a position such that it is not near a focal plane of the prism assembly/kernel. As a result, the slight structure of the absorptive louvers in the stray light-suppressing component will not be apparent in the projected image.

The glass strip layer height 350 and component thickness 355 determine a relationship between light attenuation and impact angle. To illustrate this point consider the following example. Light rays traveling through a typical LCoS kernel might have an f-number of about 2.5. If the prism is made of glass with an index of refraction of 1.7, then the half angle of the ray bundle is on the order of 6 degrees. The layer height of the component is likely to be determined by choice of a common glass thickness (e.g., LCD glass), which, for example, is 1.1 mm. If the component is cut to a thickness of 1.0 mm then light impacting the component normally is transmitted essentially 100%. Light rays at an extreme edge of the ray bundle impact at an angle of 6 degrees. If oriented in the unfavorable direction with respect to the louvers, 91% will be transmitted. All light impacting the component at an angle greater than 6 degrees is stray light. Such rays, when in the unfavorable orientation, are absorbed to a progressively greater degree as the impact angle goes up. For example, at an impact angle of 30 degrees the transmission is 48%. Therefore, stray light rays are preferentially absorbed.

Next, consider a prism assembly/kernel in which a stray light-suppressing component is included and that has the "louvers" (thin film) oriented horizontally. In this case, stray light rays are suppressed that have projections in the vertical plane. Stray light rays with projections in the horizontal plane are not affected. One way to address this deficiency is to combine multiple stray light suppressing components.

Figure 5:
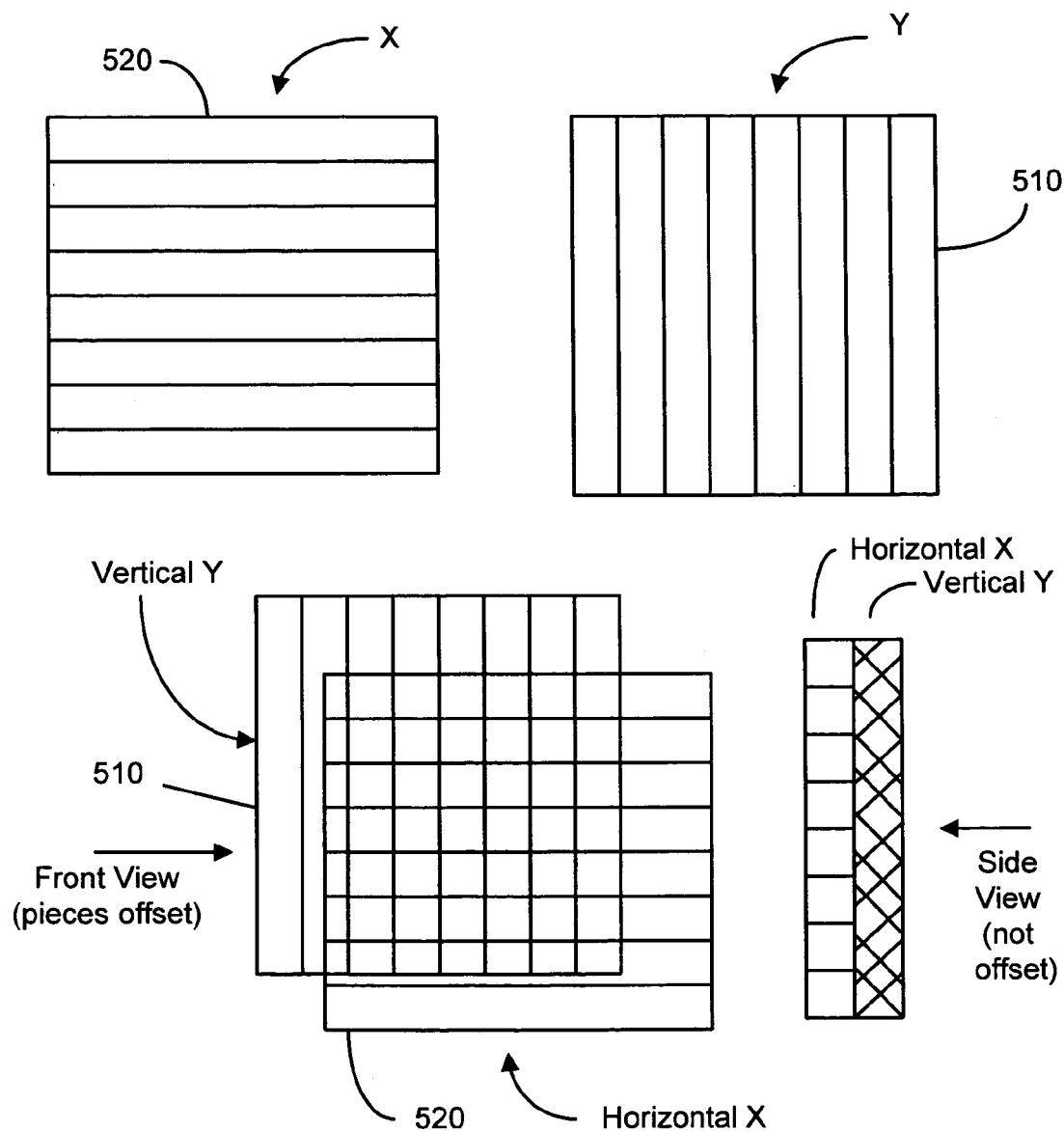
FIG. 5 is an illustration of a horizontally oriented louvered stray light suppressing component and a vertically oriented louvered stray light suppressing component according to an embodiment of the present invention.

When combining stray light suppressing components, any number of individual components may be oriented at a variety of angles. Preferably, two stray light suppressing components are utilized and oriented at 90 degrees to each other. For example, in a first component the louvers are oriented vertically while in a second component the louvers are oriented horizontally. In this way stray light rays with any orientation are suppressed. In one embodiment, the two components, stray light-suppressing component with horizontally oriented louvers 520 and a stray light-suppressing component with vertically oriented louvers 510 are placed in close physical proximity as illustrated in FIG. 5.

The present invention includes the substitution of "unused," or spacer components in existing kernel designs with a stray light-suppressing components. To match design requirements of current prism assemblies, the combined multiple stray light suppressing elements may be constructed of thinner dimensions (e.g., x and y louvered glasses of 0.5 mm component thickness each), which are combined and then inserted in place of, for example, a 1 mm thick spacer glass in an existing design. In some cases, the spacer glass in the existing design may also function to hold an additional thin film layer (e.g., polarizer, dichroic, filter, etc.). A similar additional thin film may be coated onto one of the polished surfaces of the stray light-suppressing component.

However, 0.5 mm glasses are more brittle and difficult to work with when employing labor to construct prisms and/or kernels in a factory environment. Furthermore, simply making the glasses thinner also reduces the thickness of each louver and increases the angle at which stray light is attenuated by the louvers (therefore reducing the amount of stray light reduced and/or eliminated). An alternative design and construction technique is now discussed. Thin film is deposited on 0.5 mm thickness glasses. The glasses are stacked and glued together similar to the process discussed above. The stacked glasses are cut into louvered glass pieces of approximately 1 mm component thickness, also similar to that discussed above. One side of each of the cut glass pieces are polished. Next, two pieces of the approximately 1 mm thickness louvered glass pieces are glued together at the polished sides with the louvers at 90 degrees, forming a cross hatched "louvered" glass. Finally, each of the outside sides of the cross hatched "louvered" glass are polished. Polishing of the outside sides of the cross hatched "louvered" glass continues until the cross hatched "louvered" glass is the desired thickness (1 mm in this example).

The result is a louvered cross hatched glass of the desired thickness. Individually, the louvers are ½ the thickness of the louvers described in the first construction technique. However, the louvers are also ½ the distance apart. Mathematically, the amount of stray light absorbed, reduced, and/or eliminated is therefore essentially the same as that using the first construction technique. The desired thickness glass is produced, and the production process (and subsequent assembly of the prisms/kernels) do not need to make special arrangements for the thinner and more difficult to work with glass. And finally, again, the optical pieces produced will fit into exiting prism/kernel configurations. Using similar techniques, louvered optical pieces/components of nearly any dimensions may be produced to fit other existing or proposed designs.

Figure 6:
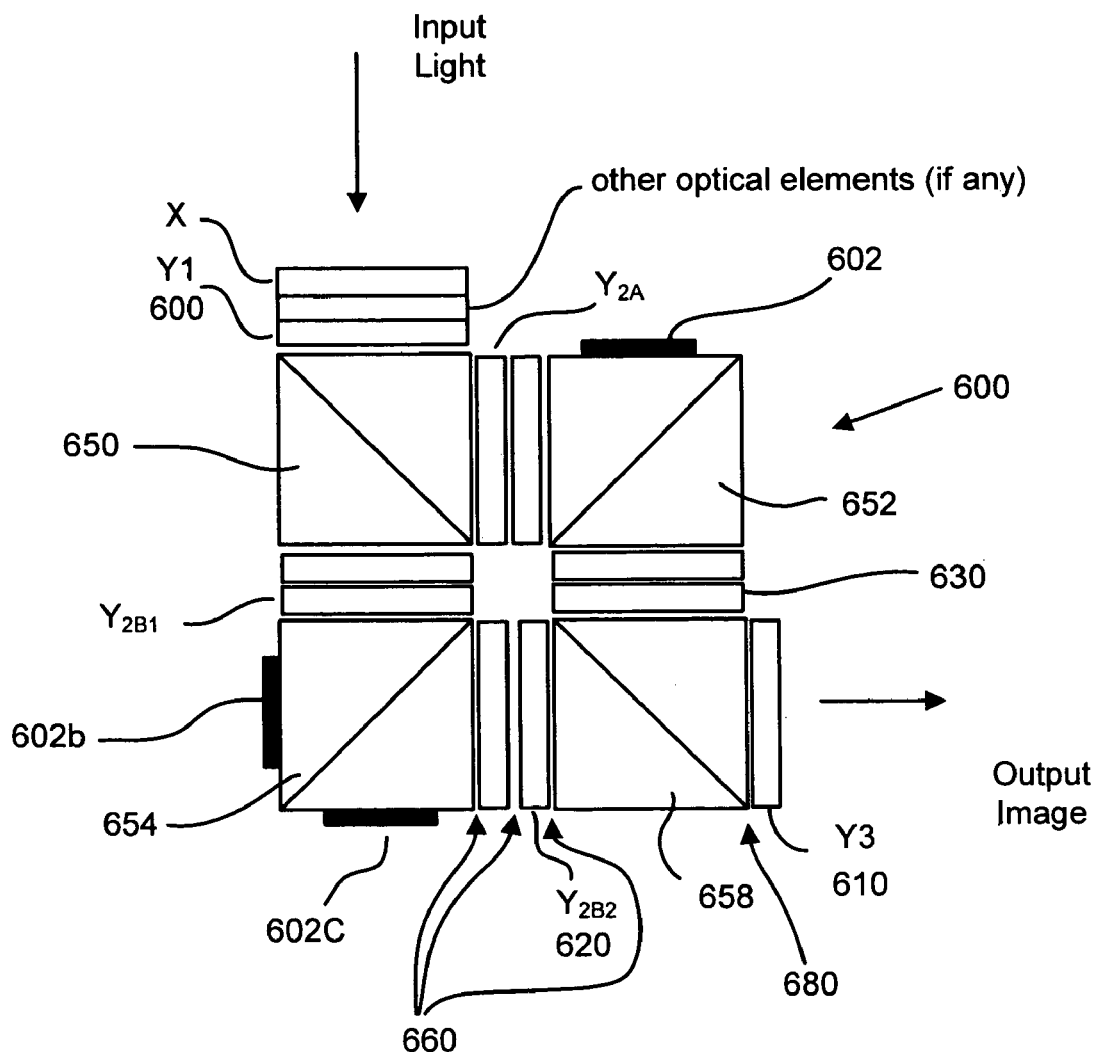
FIG. 6 is an illustration of placements of stray light suppressing components according to various embodiments of the present invention.

Turning now to placement of the stray light suppressing components within a prism/kernel. The present invention includes the placement of the stray light suppressing components located at separate locations within the prism assembly/kernel (not necessarily touching or in close proximity to each other). The present invention also includes placement of the stray light-suppressing components at locations external to the prism assembly/kernel for similar stray light suppression purposes. For example, FIG. 6 illustrates several possibilities for locating horizontal (x) and vertical (y) louvered stray light suppressing components at different locations in and around a kernel of a projection system. Note that some of the proposed possibilities utilize more than 1 horizontal and/or vertical louvered stray light suppression component because placement of the components are in a light path that has been split (e.g., proposed possibilities 2 and 3). Proposed possibility 4 has both the x and y positions external to a prism assembly of kernel 600. Note that the x and y positions may be swapped and that many other locations for each of the components is possible.

Some additional notes regarding the proposed possibilities. The locations of the louvered glasses may be, for example, at locations that would otherwise contain spacer glasses. For example, in some designs using the configuration of FIG. 6, several of the optical elements serve only as spacers. Therefore, the louvered glasses can replace one or more of the spacer locations (e.g., in at least one design, spacer glasses were replaced with louvered glasses in either of Y2B1 and Y2B2 positions of FIG. 6).

Further, it should be understood that reflections and orientations of a particular prism/kernel design may transform a Y oriented stray light into an X oriented stray light. Therefore, when placing a Y louvered glass into a particular prism design, it may need to be oriented in other than the Y direction with reference to X louvered glasses placed in the same design. Said another way, the X and Y louvered glasses preferably absorb oppositely (or at least differently) oriented stray light regardless of how the glass pieces themselves are oriented within the particular prism/kernel design.

In yet other alternatives, glass pieces having a specific functionality other than merely spacing may be replaced with louvered glass having the same specific functionality in addition to the "louvers." For example, in at least one design, at position Y2A, a green dichroic is replaced with a green dichroic having "louvers." This type of dual functionality optical element (louvered+dichroic in this example) may be produced in the manner described above, with an additional step of adding an additional optical coating (green dichroic coating in this example).

In yet other alternatives, the louvered glasses may be placed in what might otherwise be considered redundant locations (note that redundant louvered glasses are acceptable, and may be needed, depending the sensitivity of a system to stray light, and consideration of other design factors, cost, etc.). For example, X or Y louvers may be placed at both of positions Y1 and Y3. The louvered positions closer to the entrance of the kernel eliminate or reduce stray light from entering the kernel, and louvered glasses nearer the output of the kernel reduce or eliminate stray lights that occur as a result of spurious reflections and other anomalies within the kernel. Louvered pieces positioned within the kernel split the difference between suppressing stray light into the kernel and correcting stray light exiting the kernel, or, said another way, reduce or eliminate stray light that has either entered the kernel or occurring in the kernel prior to the louvered pieces, and may be utilized alone or in conjunction with input and output positioned louvered pieces. In yet another alternative, a first cross-hatch "louvered" glass is inserted in a kernel design along with a second cross-hatched "louvered" glass at a different orientation. Again, many different configurations and combinations of the louvered glasses may be utilized. Preferably, all light passing through the system is affected by at least one of each of the x and y louvered glass pieces.

Although the above describes placement of either x or y oriented louvered glass, cross hatched louvered glasses (e.g., as discussed in the second described construction technique above) may be substituted in any of these or other locations in the prism/kernel. The cross hatched louvered glasses are preferably placed at locations 620 and 630 in kernel 600. It may also be useful to place a cross hatched louvered glasses at either one or more of locations 610 and 600 as well. Note that the cross hatched louvered glasses may also be prepared as dual function optical components if needed (e.g., cross hatching plus a dichroic layer). In one embodiment, both X and Y louvered glasses are located at an output of a kernel (e.g., substituted for Y3 at location 610 in FIG. 6).

Although described mainly with reference to prism assembly and kernel designs, the present invention may be applied in numerous optical devices. The present invention is particularly well suited for use in light management systems, for example, as part of a kernel 600 as illustrated in FIG. 6.

Kernel 600 comprises a prism assembly and 3 microdisplays 602a, 602b, and 602c. The prism assembly itself is, for example, composed of 4 main optical components (beamsplitters) 650, 652, 654, and 658. Each beamsplitter comprises, for example, 2 triangular (of approximately equilateral dimensions) prisms abutted at their diagonals and a beamsplitting layer disposed between the diagonals. The exterior shape of the prism assembly is a cube.

In one embodiment, the main optical components of the prism assembly (e.g., beam splitters and optical elements such as Y2A) are liquid coupled. The beam splitters are set, for example, in prism assembly pathlength matched positions with joints (e.g., joints 660) between the beamsplitters. The joints are filled with liquid (e.g., an index matching fluid). A frame and/or a mounting plate in conjunction with an adhesive or other seal maintains the fluid within the prism assembly. Color Selects (e.g., a wavelength specific retarder product by ColorLink Corporation), dichroics, or other optical elements, if needed for the prism assembly design, may also be inserted into the joints and immersed in the index matching fluid.

The beam splitters each comprise 2 prisms abutted on their diagonals and set in beamsplitter pathlength matched positions. A beam splitting layer is disposed on one or both of the diagonals. The beam splitting layer may be any of, for example, a polarizing beam splitting thin film (a PBS beamsplitter), a single color cholesteric layer, two cholesteric layers of different colors (Cholesteric based Beam Splitters—CBSs), a dichroic layer, or any other material that can perform beam splitting.

Pathlength matched prism assemblies may be described, for example, as prism assemblies where light pathlengths between faces of the beam splitting components having microdisplays mounted thereon and a reference plane are equivalent. For example, pathlength distances from any of the microdisplays 602a, 602b, or 602c, to a reference plane (such as exit face 680, or an intermediate focal plane) are equivalent. Thus, individual light beams in each of the separately colored light beams corresponding to a same image pixel once reflected off the microdisplays arrive at the reference plane after traveling the same distance. And, since the pathlengths within the prism are matched (a pathlength matched prism assembly), distances traveled within the prism by the light beams reflected from the microdisplays are also the same.

The prism components themselves are not precise enough, particularly in mass quantity production, to affirmatively bond the prism components directly together and end up with matched pathlengths in the prism. However, Berman et al., U.S. patent application Ser. No. 10/202,595, filed Jul. 24, 2002, entitled "Method and Apparatus for Configuration and Assembly of a Video Projection Light Management System", the contents of which are incorporated herein by reference in their entirety, describes construction of a pathlength matched prism assembly in which standard mass produced optical components may be arranged in pathlength matched positions (e.g., fixed to a plate or frame, and then spaces between the components are filled with an optical coupling fluid such as mineral oil or other commercially available index matching fluid). All of the devices and construction techniques described in the above referenced patent application may be applied to construction of prism assemblies with cholesteric based beam splitting devices.

In addition, individual beam splitting components of the prism assembly may themselves be constructed as pathlength matched beamsplitters. Construction techniques for pathlength matched beamsplitters are described in Detro, U.S. patent application Ser. No. 10/251,225, filed Sep. 20, 2002, entitled "Pathlength Matched Beam Splitter and Method and Apparatus for Assembly", the contents of which are incorporated herein by reference in their entirety. The techniques taught and devices described in the above referenced patent application are also applicable to the construction of a cholesteric based pathlength matched beam splitting device, and one or more of the beamsplitters in a prism assembly or kernel may be a cholesteric based beamsplitter. Several embodiments of cholesteric based beam splitters are described in Berman, U.S. patent application Ser. No. 10/646,291 entitled "Prism Assembly With Cholesteric Reflectors" filed Aug. 22, 2003, and Berman and Detro, U.S. patent application Ser. No. 10/816,996 entitled "Advanced Prism Assemblies and Prism Assemblies With Cholesteric Reflectors" filed Apr. 2, 2004, the contents of each of which are incorporated herein by reference in their entirety. Projectors built using any of the kernel designs described above, variations of the kernel designs described above, and/or kernel designs in any of the referenced patent applications may be fitted with a transmissive LCD as described herein.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention.

Some additional designs in which the present invention is well suited are described in Berman et al., U.S. patent application Ser. No. 10/342,219 entitled "Design Of Prism Assemblies And Kernel Configurations For Use In Projection Systems" filed Jan. 13, 2003, and Berman, U.S. patent application Ser. No. 10/382,766 entitled "Method and Apparatus for Increasing Microdisplay Black State in Light Management Systems and Flexibility to Utilize Polarized or Unpolarized Input Light" filed Mar. 5, 2003, the contents of each of which are incorporated herein by reference in their entirety.

In another embodiment, the present invention utilizes higher order waveplates cut and arranged as disclosed in Berman et al., U.S. patent application Ser. No. 10/371,835 entitled "Method And Apparatus For Use And Construction Of Compensated Higher Order Waveplates" filed Feb. 20, 2003. The higher order waveplates however, have been cut and arranged with an absorptive thin film as described above.

In one embodiment, the present invention utilizes two higher order waveplates utilized to suppress stray light and produce a retardation waveplate. The higher order waveplates include a first higher order waveplate having vertically arranged louvers, and a second of the higher order waveplates 710 which includes horizontally arranged louvers. Each of the higher order waveplates being a retarder material and each having a principle axis of retardation. The substrates are bonded together with their corresponding principle axes of retardation at right angles with respect to each other. The retardation values of the waveplates differ by a desired amount of wavelength retardation (e.g., a ¼ wavelength difference (λ/4) in retardation values produces a ¼ waveplate at λ). The axes being at right angles cause the base retardation effects of each substrate to cancel out, leaving the difference which shows up as a resultant amount of retardation. The vertical and horizontal louvers suppress stray light as discussed above. In other embodiments, the thicknesses of the waveplates are adjusted, thereby adjusting the retardation values of the waveplates, to produce waveplates of other retardation values.

FIG. 7 illustrates a compensated higher order waveplate 700 constructed of two substrates (substrate #1 710 and substrate #2 720). Each of the substrates being a retarder material and each having a principle axis of retardation. The substrates are bonded together with their corresponding principle axes of retardation at right angles with respect to each other. The retardation values of the waveplates differ by a desired amount of wavelength retardation (e.g., a ¼ wavelength difference (λ/4) in retardation values produces a ¼ waveplate at λ). The axes being at right angles cause the base retardation effects of each substrate to cancel out, leaving the difference which shows up as the resultant retardation. In addition, substrates 710 and 720 are constructed to have louvers, and, when the substrates are fixed together with their principle axes of retardation at 90 degrees with respect to each other, the louvers are oriented at an angle with respect to each other. In one embodiment, the louvers are oriented at 90 degrees with respect to each other.

The substrates are preferably a birefringent material, meaning that they have two principal axes of retardation. In birefringent material, the principle axes are typically called the fast (main) axis and the slow axis. The axes relate to the molecular structure of the substrate material. In quartz crystal, the fast and slow axes are perpendicular to each other. The substrates are constructed by cutting slabs from quartz crystal material so the molecular axes are in defined directions. For example, in FIG. 7, Substrate #1 710 illustrates a fast axis (+) pointing east and a slow axis (−) pointing north. Substrate #2 720 illustrates a fast axis (+) pointing north and a slow axis (−) pointing east. Thus, the respective axes of retardation of the substrates (710 and 720) are bonded together at right angles forming a compensated higher order waveplate (the fast axis of substrate 710 is oriented at a right angle to the fast axis of substrate 720, and the slow axis of substrate 710 is oriented at a right angle to the slow axis of substrate 720). An alternative way of describing the bonded substrates is that the fast axis of one substrate is parallel to the slow axis of the other substrate.

Example: at 589 nm (in green light) the ordinary index of refraction of quartz $N_O=1.553$ and the extraordinary index $N_e=1.544$. Therefore the birefringence at 589 nm, $\Delta N=0.009$. The thickness of a 40λ waveplate is then 0.644 mm and a 40¼ λ waveplate is 0.655 nm. Therefore, a compensated higher order ¼ waveplate produced by combining the 40λ and 40¼ λ waveplates would be 1.299 mm. The selection of a specific base retardation value of 40λ is arbitrary as far as functionality is concerned. The 40λ base retardation was chosen because the thickness of the resulting compensated waveplate would be convenient to handle during assembly of an optical device (e.g., kernel) using the compensated waveplate. Furthermore, estimates have determined that such a waveplate is also affordable. This example specifically targets green light and results in a ¼ waveplate at the target wavelength, 589 nm, and slightly more or less at other wavelengths. Other indexes, birefringence, and thickness may be applied in various ways to produce similar effects at different wavelengths.

The substrates 710 and 720 are fitted together via an adhesive, preferably an optical adhesive, such as an epoxy or UV cured adhesive. Although the present inventors primarily envision the invention to be constructed using an optical adhesive, any other method of coupling the substrates may be utilized. For example, in one embodiment (e.g., see FIG. 8A), substrates 805 and 810 are coupled by an optical coupling fluid 815. To couple the substrates with optical coupling fluid, adhesive 320 secures a perimeter of the substrates, and the optical coupling fluid is injected between the waveplates. A fill hole through the adhesive (not shown) is utilized to inject the optical coupling fluid. Alternatively, surfaces of the substrates are whetted with the optical coupling fluid, placed together, and then adhesive is applied to seal in the fluid.

In another embodiment (see FIG. 8B), the substrates 805 and 810 are fitted into a frame (e.g., frame 840). The frame secures parallelism of the surfaces of the substrates. An adhesive placed in the frame secures the substrates to the frame. Space between the substrates 850 may be an air gap, or filled with optical coupling fluid. Adhesive 820 seals the space between the substrates for the liquid filled embodiments (alternatively, frame pieces may be glued in positions across the gap to seal the fluid between the substrates).

Liquid coupling has an advantage of reduced stress, particularly in a central area of the substrates but comes at increased production costs. Some techniques for utilizing optical coupling fluid are described, for example in Detro et al. I, U.S. patent application Ser. No. 10/202,595, entitled "METHOD AND APPARATUS FOR CONFIGURATION AND ASSEMBLY OF A VIDEO PROJECTION LIGHT MANAGEMENT SYSTEM"; and Berman et al., U.S. patent application Ser. No. 10/290,867, entitled "METHOD AND APPARATUS FOR PACKAGING OPTICAL ELEMENTS" each of which are incorporated herein by reference in their entirety).

Thus, using the above example with reference to FIG. 7, the stray light suppressing compensated higher order waveplate 700 operates as a quarter waveplate and suppresses stray light. Since the corresponding principle retardation axes of the substrates 710 (40λ waveplate, e.g. an nλ waveplate where n=40) and 720 (40.25λ waveplate, e.g., an (n+Δ)λ waveplate where n=40 and Δ=0.25) are at right angles, as light passes through both substrates, the effect is an optical subtraction that results in a quarter wavelength retardation (40.25−40=0.25). Any combination of base retardation values nλ (40λ in the example) may be utilized (e.g. 10λ, 20λ, 30λ, 50λ, 60λ, in whole numbers or fractional values, etc.).

The selection of a base retardation value is made so that the final thickness of the compensated higher order waveplate is suitable for any physical requirements or preferences of either a device being constructed, a manufacturing process, or other factor(s) affecting, for example, the design or dimensions of the device. Furthermore, if convenient, more than two substrates may be combined, so long as the resultant optical subtraction results in the desired amount of wavelength retardation.

Figure 9:
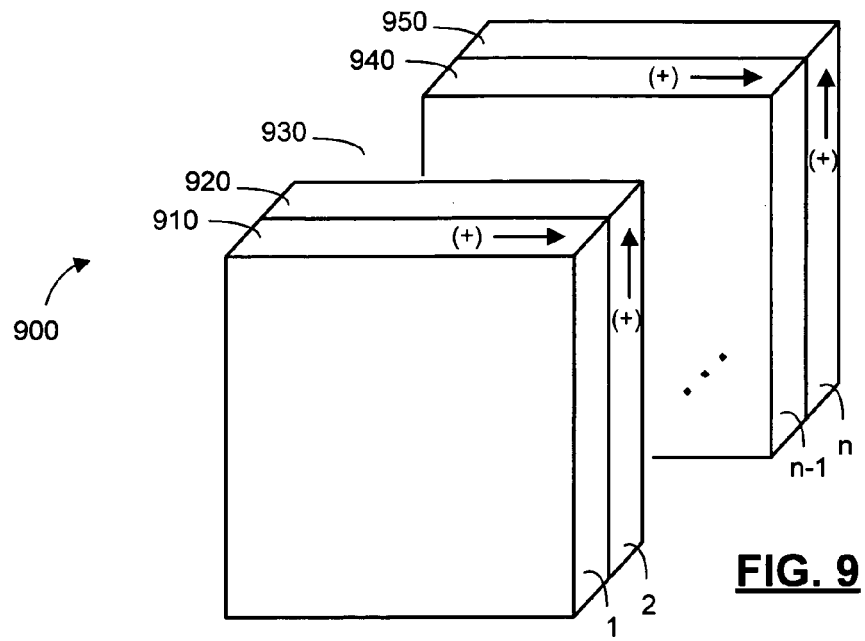
FIG. 9 is an example of a compensated higher order waveplate using n substrates arranged according to an embodiment of the present invention.

FIG. 9 is an example of a compensated higher order waveplate 900 using n substrates arranged according to an embodiment of the present invention. Substrate 1 910 is shown with a first principle fast axis of retardation (+), and substrate 2 920 is shown with a second principle fast axis of retardation (+); which is oriented 90 degrees from the first principle fast axis of substrate 910. Additional substrates 930 are also included, and may be any number of individual substrates. Substrate n-1 940 is shown with a third principle fast axis of retardation (+), and substrate n 950 is shown with a fourth principle fast axis of retardation (+) oriented 90 degrees from the third principle fast axis of substrate 940. The thickness of each of the substrates along with the orientation of their respective axes of retardation optically combine so as to produce a desired amount of retardation of polarization at λ of linear polarized light passing through the waveplate. For example, for a ½ waveplate the combined thickness of each substrate having its principle fast axis parallel with the first principle fast axis of substrate 910 is different from the combined thickness of each substrate having its principle fast axis aligned with the second principle fast axis of substrate 920. The difference is equivalent to a thickness needed to produce a ½ waveplate at λ (the target wavelength). Many different combinations of base retardations may be utilized. The combined substrates may be configured to produce any value waveplate (e.g., ¼ waveplate, ½ waveplate, ¾ waveplate, etc.). Although the resultant polarization retardation is described herein in commonly used fractional values, the resultant polarization retardation may be produced in less common increments for any amount of retardation that may be desired at any given target wavelength.

In one example, each of the substrates is optimized for red light. In this example, orientation of the substrate is described relative to a reference (ref) line that is parallel with the linear polarization of light input to the waveplate. The substrate 1 910 is a 40λ substrate with its principle fast axis of retardation parallel to the reference line (+axis parallel to ref), substrate 2 is a 10λ substrate with its principle fast axis of retardation at 90 degrees to the reference line (+axis in ref+90 degrees), substrate n-1 is 20λ (+axis parallel to ref) substrate, and substrate n is a 20.5λ (+axis in ref+90 degrees) substrate. Additional substrates 930 are a set of substrates that optically combine to produce a net retardation of 30λ (+axis in the ref+90 degrees). Then, the net result of the compensated higher order waveplate 900 is, in this example, an optical combination that produces a ½ waveplate in red light.

Using these various ways to combine substrates, great flexibility is provided to the designer and/or manufacturer of waveplates and/or devices using the waveplates.

Thus, the present invention also includes a method of designing a waveplate for an optical device. The method includes measuring an area in which a waveplate is to be inserted into the optical device, calculating thicknesses of 2 substrates to be fitted together to produce a desired waveplate and have a combined thickness within an acceptable thickness range determined by the measured area. The desired waveplate is then constructed from the 2 substrates and the desired waveplate is then utilized to manufacture the optical device.

For example, an optical device includes a spacing of approximately 60.5λ between adjacent optical elements, and a design of the optical device calls for a ¼ waveplate at λ to be inserted between the optical elements. In this case, the ¼ waveplate is constructed using 30λ and 30.25λ substrates to produce a ¼ waveplate (substrates combined as described above). A very small amount of optical adhesive is applied to portions of outer faces of the combined substrates and then the combined substrates are inserted in the 60.5λ spacing.

In one alternative, 5 10λ substrates and a sixth 10.25λ substrate are combined such that substrates 1, 3, and 5 have their principle fast axes of retardation aligned with a linear polarization of input light, and substrates 2, 4, and 6 have their principle fast axes of retardation oriented at 90° with respect to the linear polarization of the input light. In this alternative, 4 of the substrates effectively cancel each other out and one of the substrates combined with the 10.25λ substrate creates the ¼ waveplate. Again, the substrates may be placed in any order so long as the orientations of each of the principle fast axes (or other corresponding axes) are maintained as described above. The point of examples with numerous additional waveplates as shown in the preceding paragraphs is to illustrate design flexibility and alternatives provided by the present invention.

In yet another alternative, 10λ and 10.25λ substrates are combined and placed in the 60.5λ spacing with liquid coupling between at least one face of the adjacent optical elements and at least one face of the combined substrates. Any combination of mounting techniques may be utilized for the waveplate including, but not limited to, liquid coupling, direct mounting, mounting frames with adjustment screws, etc.

Inserting the waveplate (e.g., plain waveplate, or stray light-suppressing waveplate) into an optical device may be performed by gluing (optical adhesive) the manufactured waveplate onto other optical elements (e.g., prism faces) of the optical device. Other methods to insert or otherwise attach the manufactured waveplate to the optical device include liquid coupling, or immersion in a liquid coupling fluid chamber between other optical elements. Some example liquid coupling techniques are described in Berman et al. (II), U.S. patent application Ser. No. 10/328,423 entitled "Method and Apparatus for Enclosing Optical Assemblies," filed Dec. 24, 2002; Detro et al. (II), U.S. patent application Ser. No. 10/290,867 entitled "Method and Apparatus for Packaging Optical Elements," filed Nov. 7, 2002; and Detro et al. (III), U.S. patent application Ser. No. 10/251,104 entitled "Method and Apparatus for Mounting Liquid Crystal on Silicon (LCoS) and Other Sensitive Devices," filed Sep. 20, 2002, the contents of each are incorporated herein by reference in their entirety.

In many optical devices, particularly kernels and/or prism assemblies of projection display devices, physical and optical distances between various components of the optical devices are important. For example, in a kernel of a light management system (LMS) important distances include the optical distances from each of the microdisplay faces to the exit face of the kernel. The importance being that the 3 light beams (e.g., red, green, and blue) need to reach the exit face with essentially the same optical distance. The light management system will typically include a lens (or lens assembly) for focusing and projecting images contained within the three combined light beams. Generally speaking, if corresponding portions of the light beams arrive at the exit face within a depth of field of the focusing lens, then the images will be in focus. Also generally speaking, in some designs, the optical distances (and physical distances of the optical paths) between the faces of optical components (e.g., microdisplay substrates) and the exit face are roughly equivalent or within the depth of field of the focusing lens. Therefore, it is of great convenience to designers and manufacturers of prism assemblies if waveplates (retarders, polarizers, and/or other components) can be produced at equivalent thicknesses or at designer specified thicknesses so that these roughly equivalent distances can be preserved and taken full advantage of.

Methods of designing and constructing waveplates at specified thicknesses is discussed above. Another method is now described with reference to FIG. 8C. A frame 862 has a designer specified height H. In the frame, substrates 864 and 866 are arranged as described above (e.g., the principle fast axis of substrate 864 is perpendicular to the principle fast axis of substrate 866), and secured to the frame. In this example, the frame includes corners that act as stops (aligning the substrates) and provide a convenient location to secure the substrates. Adhesive (e.g., adhesive 867) is applied to the frame at the substrates (e.g., adhesive applied and then the substrates are inserted).

A gap 868 is between substrates 864 and 866. The gap compensates for any differences in thicknesses between varying thickness substrates combined to make different waveplates. For example, a red quarter waveplate constructed of 20λ and 20.25λ substrates has a slightly larger total substrate thickness, and consequently a smaller gap 868, than a green waveplate constructed of similar wavelength based substrate thickness (e.g., using green 20λ and 20.25λ substrates instead of red). Using this frame based technique to create designer specified waveplate dimensions frees the manufacturer to use substrates having a wide range of substrates thicknesses to produce the waveplates (The designer specifies an overall thickness and a target wavelength, and the manufacturer uses available substrate stocks in a combination to produce the target wavelength retardation in a frame size equivalent to the designer's specified overall thickness).

In another example, a kernel designer may want certain optical paths within a kernel to match exactly. The present invention includes constructing a higher order waveplate in an optical path of a kernel in which heights (e.g., both H and h) of frames of higher order waveplates in various optical paths are varied to make each optical path exactly matched.

Figure 11:
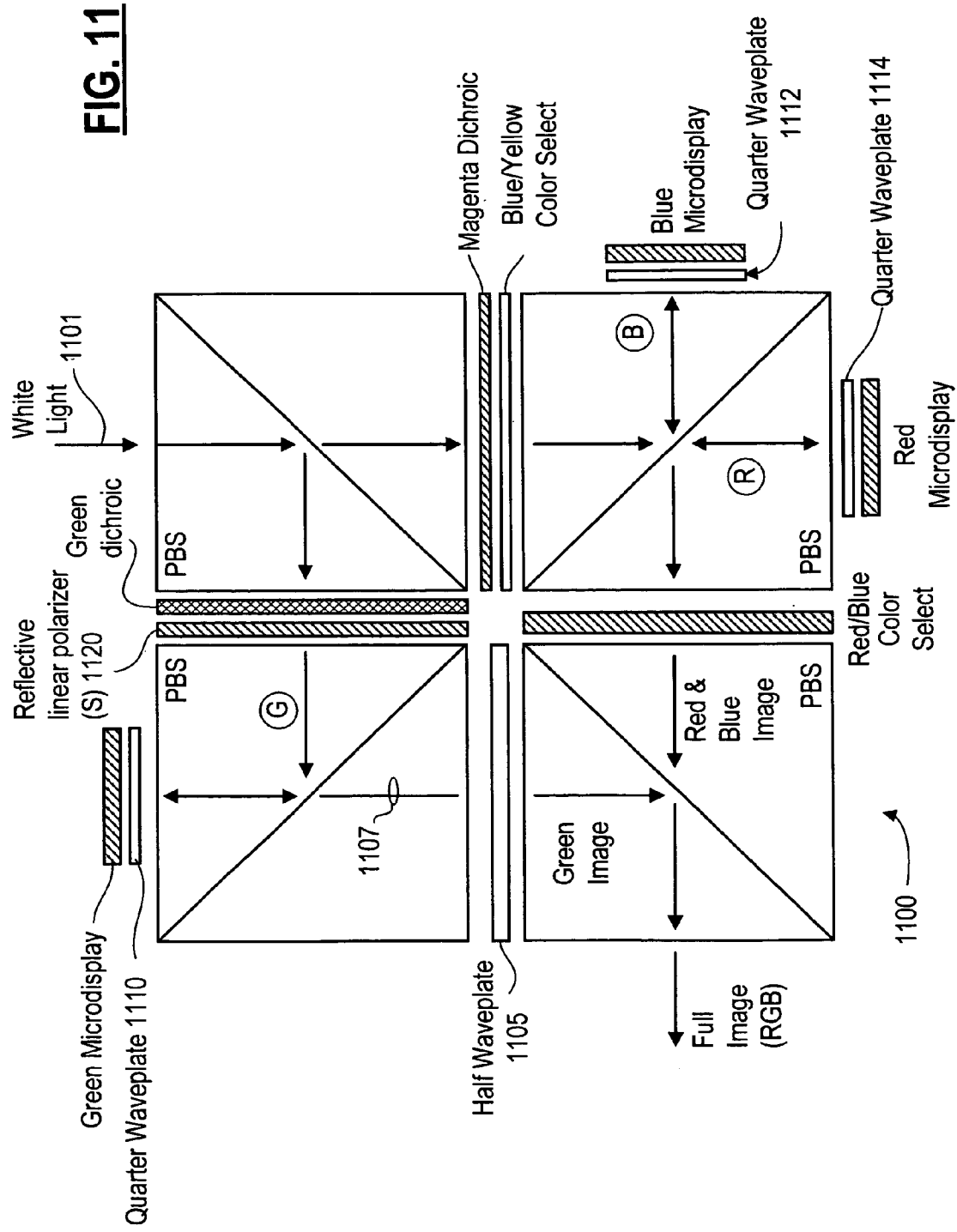
FIG. 11 is a diagram of a quad style LCoS based kernel 1100 that includes at least one stray light suppressing element according an embodiment of the present invention.

FIG. 11 is a diagram of a quad style LCoS based kernel 1100 that converts white light into a full RGB image. Any of waveplates 1110, 1112, 1114, 1105, dichroics, or spacer glasses (not shown), etc. may be constructed using one or more of the above described embodiments. Waveplates 1110, 1112, and 1114 may be constructed of specific design requirements in order to match pathlengths from each of the microdisplays to the full image (RGB) output. For example, assuming a prism assembly (kernel without the attached microdisplays) with approximately perfect outside dimensions and approximately equivalent physical light path distances inside the prism assembly, then, the frames for the red waveplates would be slightly longer than frames for green waveplates, which would be slightly longer than frames for blue waveplates. In yet another example, frame heights may be adjusted to compensate for lightpath differences (e.g., differences in internal lightpaths of the prism assembly, assuming less than perfect dimensions within the prism assembly).

Thus, the gap 868 not only allows flexibility in construction, but also reduces problems encountered when optical components are fixed together (e.g., such as stress build up or other artifacts, such as Newton Rings, which can occur if the optical components were to contact each other).

The gap 868 is, for example, an air gap between the substrates. Surfaces of the substrates exposed to air are coated with anti-reflection coatings. In another embodiment, the gap 868 is sealed with adhesive and/or a combination of adhesive and a frame member and the gap is filled with an optical coupling fluid.

The invention includes mounting the waveplates to a face of an optical component. For example, frame 862 is illustrated as mounted to a face 860 of a polarizing beamsplitter (PBS) cube. The PBS is, for example, a pathlength matched PBS as described in Detro et al. IV, U.S. patent application Ser. No. 10/251,225, entitled "PATHLENGTH MATCHED BEAM SPLITTER AND METHOD AND APPARATUS FOR ASSEMBLY". The polarizing beam splitter is, for example, a component of a pathlength matched prism assembly as described in Detro et al. I. One method of mounting comprises adhesive 371 applied to a portion of the frame and/or to the face 360 of the PBS to secure the waveplates to the PBS. With the described frame, a waveplate/component gap 870 occurs between the component and substrate 866. Faces of the substrate 866 and component are coated with anti-reflection coatings (which reduce or eliminate unwanted reflections, including the prevention of standing waves that might otherwise develop between the substrates). In one embodiment, the gap 870 is sealed and filled with optical coupling fluid.

Figure 8C:
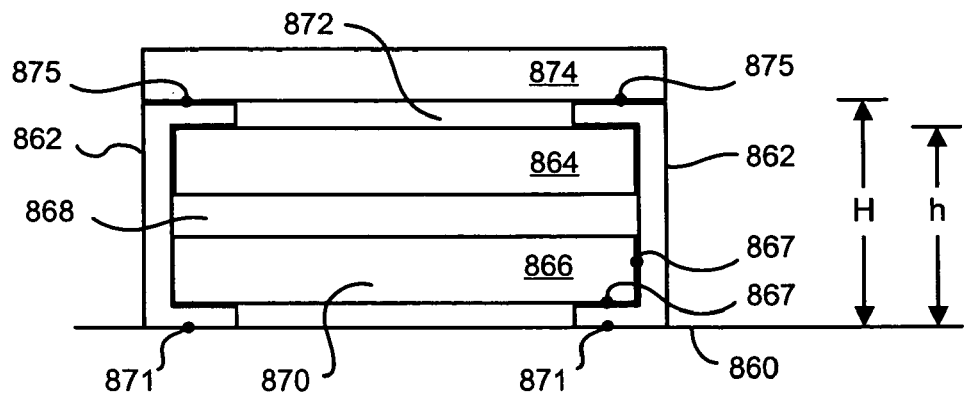
FIG. 8C is a drawing that illustrates a compensated higher order waveplate and a construction method thereof according to embodiments of the present invention.
Figure 8D:
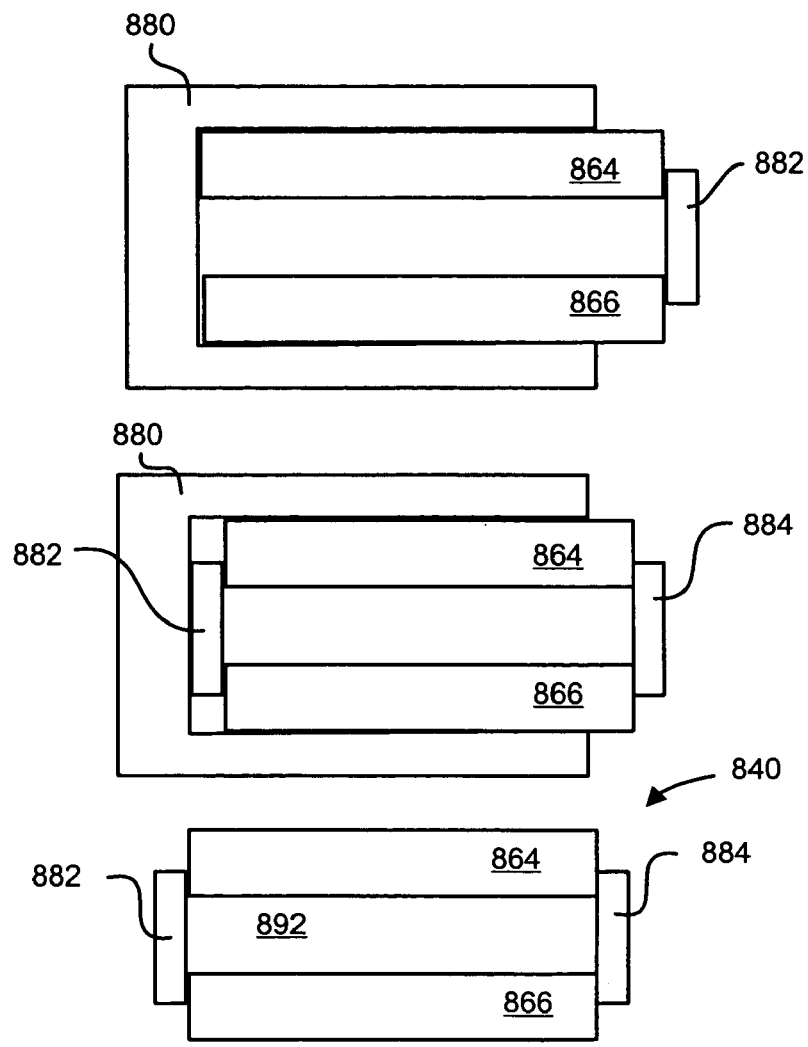
FIG. 8D illustrates construction of another embodiment of a waveplate according to the present invention.

Continuing with FIG. 8C, a microdisplay 874 is mounted on the frame 862. Adhesive is applied, for example, at point 875 securing the microdisplay 874 to the frame. A microdisplay/waveplate gap 872 occurs between the waveplate and microdisplay 874. A face of the substrate 864 adjacent to the microdisplay and a face of the microdisplay adjacent to substrate 864 are coated with anti-reflection coatings. In one embodiment, as either an alternative to or combined with anti-reflection coatings, the gap 872 is sealed and filled with optical coupling fluid.

Any number of alternative techniques for mounting the waveplates and microdisplays may be utilized. Several alternatives are described in Detro et al. III.

Substrates 864 and 866 are arranged according to the present invention in a precision C-clamp style holder 880. The holder 380 includes, for example, vacuum chucks that temporarily secure the substrates in the holder 880. Adhesive is applied to end portions of the waveplates and/or frame member 882 and the frame member is secured by the adhesive at the end portions of the waveplates. Next, the substrates are removed from the holder and reinserted in the opposite direction. A second frame member 884 is then similarly attached to opposite end portions. Faces of the substrates surrounding gap 892 are coated with anti-reflection coatings, or the gap is sealed and filled with optical coupling fluid. The finished waveplate 890 includes the substrates and frame members (as with all drawings submitted herewith, the drawings are not specifically to scale). The holder 880 may take the form of an adjustable vise device such as that described in Berman et al., which sets spacings of the substrates to any reasonable value.

As noted above, the compensated higher order waveplates are constructed to act as a waveplate at a specific target frequency. However, the single compensated higher order waveplate has effects of polarization rotation at other frequencies not at the target frequency. For some applications, these other retardation effects may be negligible for light in a same spectrum band as the target frequency. For example the compensated higher order waveplate that targets 589 nm light will have more or less retardation at other wavelengths also in the green spectrum, but the differing amounts of retardation in the green spectrum can be acceptable.

However, in other wavelength bands (e.g. red light), the amount of retardation may be of an amount that is either unusable or undesirable. In applications such as some kernel designs (e.g., kernel 1100) the undesirability of retardation effects outside the targeted wavelength band is negated by the fact that only light in the targeted wavelength band is input. For example, in kernel 1100, the green ¼ waveplate 1110 may be a compensated higher order waveplate without much concern for undesirable retardation effects out of the target wavelength band because only (or only substantially)

green light is input to the waveplate. The same principle applies to each of waveplates 1112 and 1114.

Nevertheless, some applications require wavelength band specific retarders that affect (retard) the linear polarization in a targeted wavelength band(s) and preserve linear polarization in other wavelength bands (e.g., 1λ, 2λ, . . . nλ retardation in other wavelength bands preserves the original linear polarization). The present inventors have realized the ability of the compensated higher order waveplates to be utilized in creating a desired wavelength band specific retarder for one or multiple wavelengths. The basic process is to calculate a set of compensated higher order waveplates combined at specific angles where the sum of retardations and other optical properties of the set of compensated higher order waveplates together at those specific angles produce the desired wavelength band specific retarder.

Figure 10:
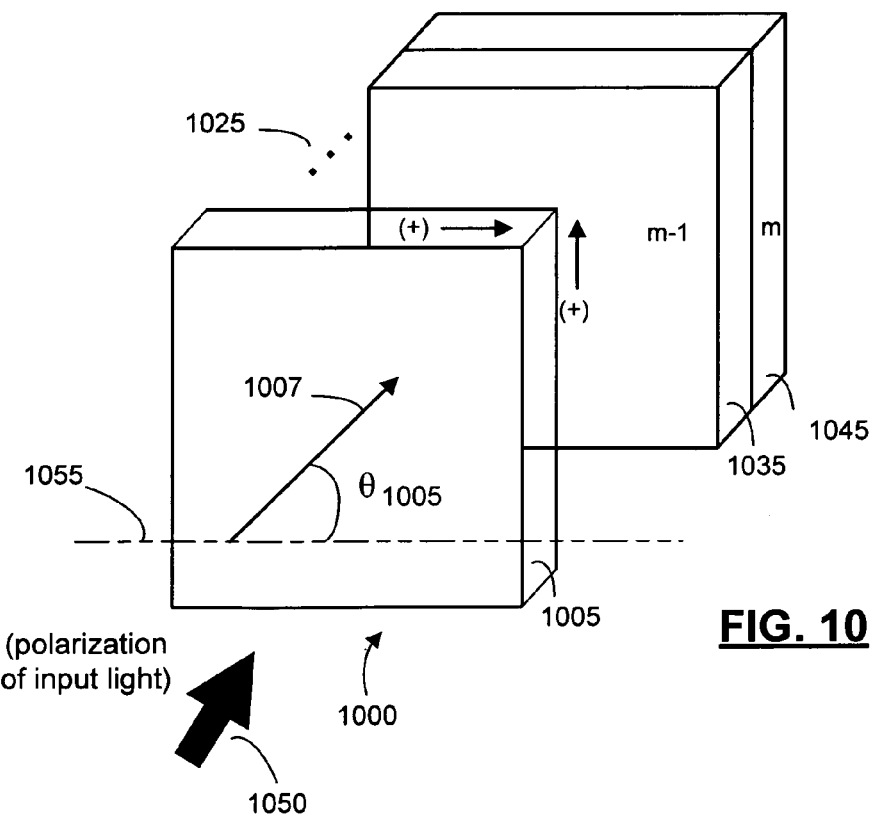
FIG. 10 is an example of one set of possible configurations for a wavelength band specific retarder utilizing compensated higher order waveplates according to an embodiment of the present invention.

FIG. 10 is an example of a wavelength band specific retarder 1000 using m compensated higher order waveplates arranged according to an embodiment of the present invention. Compensated higher order waveplate 1005 is shown with a main axis of retardation 1007 at an orientation of $\theta_{1005}$. Orientation of the main axis 1007 is described in the figure with reference to reference line 1055. Reference line 1055 is aligned at a same angle of linear polarization of input light 1050 entering the wavelength band specific retarder 1000. Orientation of the main axis 1007 is at an angle $\theta_{1005}$ relative to the linear polarization of input light 1050.

Other compensated higher order waveplates 1025 also have main axes of retardation (not shown) which are positioned at various angular orientations with respect to the reference line 1055. Additional other compensated higher order waveplates 535 and 1045 also each include their own respective main axes of retardation and orientations at respective angles to the reference 1055 (e.g., $\theta_{1035}$ and $\theta_{1045}$). Each of the angles of orientation are either the same, more, or less than any of the previous waveplates, and the actual amount of angular orientation of each waveplate depending on the calculations performed to determine the specific angles needed to produce a desired wavelength band specific retarder. The calculations performed are done in accordance with known wavelength specific properties and using formulas available in textbooks, literature, and other patents. In addition, the actual band(s) in which the desired wavelength band specific retarders operate is also determined by calculation and used in the construction of the component compensated higher order waveplates and/or the orientation and placement of each component in the wavelength band specific retarder.

Each of the above described main axes refer to one of the axes (or combination of axes) present in the substrate components of the compensated higher order waveplates. The construction of the compensated higher order waveplate being the combination of substrates with corresponding axes (e.g., principle fast axes) of the substrates at right angles (e.g., fast axis of the nλ substrate parallel to slow axis of the (n+Δ)λ substrate, etc.). Here, when referring to the main axis of the compensated higher order waveplate, we are referring to an axis parallel to the fast axis of the (n+Δ)λ substrate. Each of the compensated higher order waveplates are described using a similarly determined main axis, and all angles of orientation of the axes are relative to the polarization of light input to the wavelength band specific retarder 1000. However, it should be understood that any of the waveplates or wavelength band specific retarders herein may be described using other axes or frames of reference that maintain a similar or functionally equivalent orientation of the substrates, waveplates, etc.

FIG. 10 is operable as a wavelength band specific retarder with or without the additional compensated higher order waveplates 1025. In one example, a red wavelength band specific retarder is produced by using 3 compensated higher order waveplates, a first compensated higher order waveplate 1005 is constructed targeting a 475 nm wavelength, a second compensated higher order waveplate m-1 1025 is constructed targeting a 950 nm wavelength, and a third compensated higher order waveplate m 1045 is constructed also targeting the 950 nm wavelength. The first compensated higher order waveplate 1005 has its main axis set at 45 degrees with respect to the reference line (or intended polarization of input light). The second compensated higher order waveplate 1035 has its main axis set at −13.2 degrees with respect to the reference line, and the third compensated higher order waveplate 1045 has its main axis set at 9.9 degrees with respect to the reference line. The resultant combination of the three compensated higher order waveplates is a wavelength band specific retarder that converts the linear polarized red wavelength band of light input to the wavelength band specific retarder to orthogonal polarization (90 degrees), while preserving the polarization of the input light in the blue and green wavelength bands.

In another example, a red wavelength band specific retarder is produced by using 5 compensated higher order waveplates, a first compensated higher order waveplate 505 is constructed targeting a 475 nm wavelength. Additional compensated higher order waveplates 1025 comprise 2 individual compensated higher order waveplates, identified as waveplates 1026 and 1027, are each constructed targeting a 950 nm wavelength. 4th and 5th waveplates, 1035 and 1045 respectively are also constructed targeting the 950 nm wavelength. With respect to the polarization of input light (e.g., reference 1055), the main axis of each waveplate is oriented as follows: 1005 at 45 degrees, 1026 at −15.0 degrees, 1027 at 13.1 degrees, 1035 at −2.1 degrees, and 1045 at 6.3 degrees.

In another example, a red wavelength band specific retarder is produced by using 7 compensated higher order waveplates, a first compensated higher order waveplate 1005 is constructed targeting a 475 nm wavelength. Additional compensated higher order waveplates 1025 comprise 4 individual compensated higher order waveplates, identified as waveplates 1026, 1027, 1028, and 1029, each constructed targeting a 950 nm wavelength. 6th and 7th waveplates, 1035 and 1045 respectively are also constructed targeting the 950 nm wavelength. With respect to the polarization of input light (e.g., reference 1055), the principle axis of each waveplate is oriented as follows: 1005 at 45 degrees, 1026 at −15.5 degrees, 1027 at 14.0 degrees, 1028 at −3.4 degrees, 1029 at 7.8 degrees, 1035 at 0.5 degrees, and 1045 at 5.2 degrees.

In yet another example, a red wavelength band specific retarder is produced by using 9 compensated higher order waveplates, a first compensated higher order waveplate 505 is constructed targeting a 475 nm wavelength. Additional compensated higher order waveplates 1025 comprise 6 individual compensated higher order waveplates, identified as waveplates 1026, 1027, 1028, 1029, 1030, and 1031, each constructed targeting a 950 nm wavelength. 8th and 9th waveplates, 1035 and 1045 respectively are also constructed targeting the 950 nm wavelength. With respect to the polarization of input light (e.g., reference 1055), the main axis of each waveplate is oriented as follows: 1005 at 45 degrees, 1026 at −15.7 degrees, 1027 at 14.5 degrees, 1028 at −4.0 degrees, 1029 at 8.5 degrees, 1030 at −0.4 degrees, 1031 at 6.1 degrees, 1035 at 1.5 degrees, and 1045 at 4.7 degrees.

In the above described example embodiments, as more waveplates are used, the more precisely the wavelength band specific retarder's operations are (e.g., cutting off at a more precise wavelength where polarization rotation either occurs or does not occur). Said another way, as more waveplates are used, a transition band, between polarized light that is rotated and linear polarized light that is not rotated, where the light is elliptically polarized becomes smaller. Further embodiments may use more compensated higher order waveplates to further refine the optical properties of the wavelength band specific retarder.

Although the above examples are red wavelength band specific retarders, the invention is not limited to red wavelength band specific retarders. Similar arrangements may be made for orienting compensated higher order waveplates to construct wavelength band specific retarders for any band of light. For example, wavelength band specific retarders may be constructed using similar techniques for blue and green light. The number of compensated higher order waveplates, each specific target wavelength, and orientation will be set according to the requirements for the desired wavelength band specific retarder.

The present invention includes the use of stacking wavelength band specific retarders to produce multi non-contiguous wavelength band specific retarders. In this example, multiple wavelength band specific retarders are constructed. The multiple wavelength band specific retarders are placed in series. Light is orthogonally polarized for each of the bands according to the construction of the multiple wavelength band specific retarders and the polarization of other bands of light are left unrotated. For example, wavelength band specific retarders are constructed for each of red and blue wavelength bands. The red and blue wavelength band specific retarders are placed in series and linear polarized input light in both the red and blue bands are rotated and the linear polarization of input light in the green band is maintained.

Wavelength band specific retarders and multi non-contiguous wavelength band specific retarders according to the present invention may be constructed for any one or more wavelength bands or portions of bands.

The present invention also includes stacking a set of compensated higher order waveplates without regard to any particular contiguous subset thereof being a wavelength band specific retarder. However, the net effect of the stacked compensated higher order waveplates is either a single or multi non-contiguous wavelength band specific retarder, depending on the requirements, design, and combined properties of the individual compensated higher order waveplates. The possible combinations of individual compensated higher order waveplates, orientations, etc is virtually limitless. The present invention clearly includes any compensated higher order waveplate whether used individually as a waveplate targeting a specific wavelength (or range of wavelengths), as a component in a larger system, or, in combination with other compensated higher order waveplates to produce wavelength band specific retarders in one or more bands.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention.

In any of the waveplate embodiments described above, plain (waveplate only) waveplates may be constructed, or the waveplates may also be stray light-suppressing waveplates by constructing the substrates to include louvers. In constructing stray light-suppressing higher order waveplates, the orientation of a principle axis of retardation in the retarder material must be properly oriented in the substrate material. One method, for example, utilizing the steps described above with respect to FIG. 4, the starting material (previously glass, but quartz in this example), has a principle axis of retardation perpendicular to the page for the labeled starting material, which results in a principle axis of retardation perpendicular to the thin film layer at steps 1–4.

Obviously, numerous modifications and variations of the present invention are possible in light of the above teachings. It is therefore to be understood that the invention may be practiced otherwise than as specifically described herein.

What is claimed is:

1. A stray light suppressing optical element comprising:
   a first set of parallel louvers; and
   a second set or parallel louvers in optical series with and oriented at an angle to the first set of parallel louvers.

2. The stray light suppressing optical element according to claim 1, wherein the first set of parallel louvers are embedded in a first multi-layer glass sandwich.

3. The stray light suppressing optical element according to claim 2, wherein the second set of parallel louvers is embedded in a second multi-layer glass sandwich.

4. The stray light suppressing optical element according to claim 3, wherein the first multi-layer glass sandwich is affixed to the second multi-layer glass sandwich.

5. The stray light suppressing optical element according to claim 3, wherein:
   the multi-layer glass sandwiches are each cut from bi-refringent material and constructed to have a principle axis of retardation in a plane of the multi-layer glass sandwich; and
   the principle axes of retardation of the multi-layer glass sandwiches are arranged at an angle with respect to each other to produce an optical effect.

6. The stray light suppressing optical element according to claim 5, wherein the optical effect comprises a waveplate.

7. The stray light suppressing optical element according to claim 2, wherein the louvers are arranged such that light incident to a normal of a surface of the glass sandwich is transmitted, and light off normal and toward the louvers is at least partially absorbed by the louvers.

8. The stray light suppressing optical element according to claim 2, wherein the multi-layer glass sandwich is cut from a bi-refringent material and constructed to have a principle axis of retardation in a plane of the multi-layer glass sandwich.

9. A method, comprising the steps of:
   coating a surface of a set of transparent materials with a light absorptive thin film layer;
   bonding the set of coated transparent materials to create a multi-layer sandwich having layers in an order comprising light absorptive thin film, transparent material, light absorptive thin film, transparent material, and so forth;
   cutting the bonded materials into thin sheets, each sheet comprising a strip of transparent material, thin film layer, a strip of transparent material, a thin film layer, and so forth; and
   polishing the cut surfaces of the thin sheets.

10. The method according to claim 9, further comprising the step of continuing to polish the cut surfaces of the thin sheets until a predetermined thickness is attained.

11. The method according to claim 9, wherein the transparent material is a bi-refringent material having a principle axis of retardation perpendicular to the thin film layer.

12. The method according to claim 9, wherein the transparent material is a bi-refringent material having a principle axis of retardation parallel to the thin film layer.

13. The method according to claim 9, further comprising the step of bonding a first of the thin sheets to a second of the thin sheets such that the thin film layers of the first thin sheet are at an angle to the thin film layers of the second of the thin sheets.

14. The method according to claim 13, wherein the angle is 90 degrees.

15. A stray light suppressing compensated higher order waveplate, comprising:
a first substrate having a first axis of retardation;
a first series of louvers disposed in the first substrate; and
a second substrate having a second axis of retardation;
wherein the first substrate and the second substrate are positioned such that the first axis of retardation is set at an angle to the second axis of retardation.

16. The waveplate according to claim 15, wherein said angle is 90°.

17. The waveplate according to claim 15, wherein the first axis of retardation is a principle axis of retardation of the first substrate and the second axis of retardation is a principle axis of retardation of the second substrate.

18. The waveplate according to claim 15, wherein the substrates are constructed from bi-refringent materials.

19. The waveplate according to claim 18, wherein the substrates are quartz.

20. The waveplate according to claim 15, further comprising a second series of louvers disposed in the second substrate.

21. The waveplate according to claim 20, wherein the first series of louvers are disposed at 90 degrees with respect to the second series of louvers.

22. The waveplate according to claim 16, wherein the first substrate is a $n\lambda$ waveplate and the second substrate is a $(n+\Delta)\lambda$ waveplate.

23. The compensated higher order waveplate according to claim 22, wherein $\Delta\lambda$ is an incremental retardation that produces a desired amount of retardation of a lightwave at $\lambda$ passing through the compensated higher order waveplate.

24. The compensated higher order waveplate according to claim 23, wherein $\lambda$ comprises a wavelength of at least one of red, blue, and green light.

25. The waveplate according to claim 15, wherein the first substrate and the second substrate are fitted in a frame that maintains registration and a gap between the substrates.

26. The waveplate according to claim 15, wherein said higher order compensated waveplate is mounted between a Liquid Crystal on Silicon (LCoS) microdisplay and an optical element of a light projection system.

27. The compensated higher order waveplate according to claim 26, wherein said light projection system comprises a pathlength matched prism assembly.

28. A wavelength band specific retarder, comprising:
a set of compensated higher order waveplates each having a principle axis of retardation and a predetermined target wavelength;
wherein:
the set of higher order waveplates are arranged in series;
the waveplate main axes are oriented at individual angles of orientation to a reference line such that the specific wavelength band is retarded when passing through the wavelength band specific retarder; and
at least one set of parallel louvers,
wherein each set of parallel louvers are disposed in one of the higher order waveplates.

29. The wavelength band specific retarder according to claim 28, wherein at least two of the sets of louvers are disposed at an angle to each other.

30. The wavelength band specific retarder according to claim 28, wherein:
the set of compensated higher order waveplates comprises 3 compensated higher order waveplates targeting 475 nm, 950 nm, and 950 nm wavelengths respectively, and oriented at 45 degrees, −13.2 degrees, and 9.9 degrees respectively.

31. A prism assembly, comprising:
at least one louvered glass;
wherein the at least one louvered glass comprises a sandwich stacked series of glass strips and a light absorbing thin film layer disposed between adjacent glass strips.

32. The prism assembly according to claim 31, wherein the prism assembly is a liquid coupled pathlength matched prism assembly.

33. The prism assembly according to claim 31, wherein the prism assembly is utilized in a Liquid Crystal on Silicon (LCoS) based projection television.

34. The wavelength band specific retarder according to claim 28, wherein the retarder is disposed in a lightpath of a projection system.

35. The wavelength band specific retarder according to claim 34, wherein the projection system is a Liquid Crystal on Silicon (LCoS) based projection Television.

36. The stray light suppressing waveplate according to claim 15, wherein the waveplate is disposed in a light path of a Liquid Crystal on Silicon (LCoS) based projection.

37. The method according to claim 9, further comprising the step of installing at least one of the thin sheets in a kernel.

38. The method according to claim 37, wherein the kernel is a Liquid Crystal on Silicon (LCoS) based kernel of an LCoS television.

39. The stray light suppressing element according to claim 1, wherein the element is disposed in a light path of a Liquid Crystal on Silicon (LCoS) based projection.

40. A video projector comprising:
a stray light suppressing mechanism comprising:
a first set of parallel louvers; and
a second set or parallel louvers in optical series with and oriented at an angle to the first set of parallel louvers;
wherein each set of parallel louvers are disposed in an image light path of the video projector.

41. The video projector according to claim 40, wherein the angle is 90°.

42. The video projector according to claim 40, wherein the light path is an output light path of the video projector.

43. The video projector according to claim 40, wherein the light path is a light path in a Liquid Crystal on Silicon (LCoS) based light engine of the video projector.

* * * * *